(12) United States Patent
Ning et al.

(10) Patent No.: US 10,400,627 B2
(45) Date of Patent: Sep. 3, 2019

(54) SYSTEM FOR COOLING A TURBINE ENGINE

(71) Applicant: GENERAL ELECTRIC COMPANY, Schenectady, NY (US)

(72) Inventors: Wei Ning, Cincinnati, OH (US); Dennis Paul Dry, Cincinnati, OH (US); Mullahalli Venkataramaniah Srinivas, Mason, OH (US)

(73) Assignee: General Electric Company, Schenectady, NY (US)

( * ) Notice: Subject to any disclaimer, the term of this patent is extended or adjusted under 35 U.S.C. 154(b) by 307 days.

(21) Appl. No.: 14/674,186

(22) Filed: Mar. 31, 2015

(65) Prior Publication Data
US 2016/0290157 A1 Oct. 6, 2016

(51) Int. Cl.
*F01D 25/12* (2006.01)
*F01D 9/04* (2006.01)
(Continued)

(52) U.S. Cl.
CPC ............ *F01D 25/12* (2013.01); *F01D 5/187* (2013.01); *F01D 9/041* (2013.01); *F01D 9/065* (2013.01);
(Continued)

(58) Field of Classification Search
CPC ... F01D 5/08; F01D 5/18; F01D 5/187; F01D 5/188; F01D 5/189; F01D 9/041; F01D 9/06; F01D 9/065; F01D 11/08; F01D 11/24; F01D 25/08; F01D 25/12; F01D 25/14; F05D 2220/30; F05D 2220/32; F05D 2220/3212; F05D 2240/11; F05D 2240/12;
(Continued)

(56) References Cited

U.S. PATENT DOCUMENTS 3,703,808 A    11/1972   Eldon
4,820,116 A *   4/1989   Hovan ...................... F01D 1/32
                                                                             415/115
(Continued)

FOREIGN PATENT DOCUMENTS

CN         101943032 A     1/2011
CN         102562169 A     7/2012
(Continued)

OTHER PUBLICATIONS

European Search Report issued in connection with corresponding EP Application No. 16162942.3 dated Sep. 6, 2016.
(Continued)

*Primary Examiner* — Justin D Seabe
*Assistant Examiner* — Alexander A White
(74) *Attorney, Agent, or Firm* — Dority & Manning, P.A.

(57) ABSTRACT

In one aspect the present subject matter is directed to a system for cooling a turbine engine. The system includes a cooling medium source, a stator vane having an internal flow passage that is in fluid communication with the cooling medium source and a turbine shroud assembly having an internal flow passage that is in fluid communication with the internal flow passage of the stator vane. The system allows for reduced peak thermal gradients between a cooling medium provided by the cooling medium source and various turbine hardware components such as the turbine shroud assembly.

17 Claims, 6 Drawing Sheets

(51) Int. Cl.
*F01D 11/08* (2006.01)
*F01D 5/18* (2006.01)
*F01D 9/06* (2006.01)
*F01D 11/24* (2006.01)

(52) U.S. Cl.
CPC .............. *F01D 11/08* (2013.01); *F01D 11/24* (2013.01); *F05D 2220/30* (2013.01); *F05D 2220/32* (2013.01); *F05D 2240/11* (2013.01); *F05D 2240/12* (2013.01); *F05D 2240/30* (2013.01); *F05D 2260/201* (2013.01); *F05D 2260/202* (2013.01); *F05D 2260/205* (2013.01); *Y02T 50/672* (2013.01); *Y02T 50/676* (2013.01)

(58) Field of Classification Search
CPC ............ F05D 2240/30; F05D 2240/81; F05D 2260/201; F05D 2260/202; F05D 2260/205
See application file for complete search history.

(56) References Cited

U.S. PATENT DOCUMENTS

| | | | | |
|---|---|---|---|---|
| 5,253,976 | A * | 10/1993 | Cunha | F01D 5/182 415/114 |
| 8,142,138 | B2 * | 3/2012 | Heda | F01D 11/24 415/115 |
| 2002/0122716 | A1 * | 9/2002 | Beacock | F01D 5/188 415/1 |
| 2002/0148233 | A1 | 10/2002 | Tiemann | |
| 2003/0035717 | A1 | 2/2003 | Tiemann | |
| 2008/0112791 | A1 | 5/2008 | Lee et al. | |
| 2008/0112795 | A1 | 5/2008 | Lee et al. | |
| 2009/0129917 | A1 * | 5/2009 | Hazevis | F01D 11/005 415/173.1 |
| 2012/0134781 | A1 * | 5/2012 | Khanin | F01D 5/187 415/115 |
| 2012/0257954 | A1 | 10/2012 | Chanteloup et al. | |
| 2016/0230663 | A1 * | 8/2016 | Mizukami | F02C 3/13 |

FOREIGN PATENT DOCUMENTS

| | | |
|---|---|---|
| CN | 103183519 A | 7/2013 |
| EP | 1245806 A1 | 10/2002 |
| EP | 2458163 A2 | 5/2012 |
| JP | H0510102 A | 1/1993 |
| JP | H07317562 A | 12/1995 |
| JP | H10231703 A | 9/1998 |
| JP | H10266805 A | 10/1998 |
| JP | 2001107703 A | 4/2001 |
| JP | 2003106169 A | 4/2003 |
| JP | 2003307136 A | 10/2003 |
| JP | 3727701 B2 | 12/2005 |
| JP | 2008121672 A | 5/2008 |
| JP | 2008121673 A | 5/2008 |
| JP | 2008274818 A | 11/2008 |
| JP | 2010090816 A | 4/2010 |
| JP | 2010276010 A | 12/2010 |
| JP | 2014020326 A | 2/2014 |
| WO | 2010041552 A | 4/2010 |
| WO | 2015041346 A1 | 3/2015 |

OTHER PUBLICATIONS

Unofficial English Translation of Japanese Search Report issued in connection with corresponding JP Application No. 2016059359 dated Mar. 21, 2017.

Unofficial English Translation of Japanese Office Action issued in connection with corresponding JP Application No. 2016059359 dated Mar. 28, 2017.

Machine Translation of First Office Action and Search issued in connection with corresponding CN Application No. 201610195118.3 dated Dec. 28, 2018.

* cited by examiner

SYSTEM FOR COOLING A TURBINE ENGINE

FIELD OF THE INVENTION

The present subject matter relates generally to a turbine engine. More particularly, the present subject matter relates to a system for cooling various turbine components of the turbine engine such as a turbine shroud assembly.

BACKGROUND OF THE INVENTION

A gas turbine engine generally includes, in serial flow order, a compressor section, a combustion section, a turbine section and an exhaust section. In operation, air enters an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. In particular configurations, the turbine section includes, in serial flow order, a high pressure (HP) turbine and a low pressure (LP) turbine. The HP turbine and the LP turbine at least partially define a hot gas path of the gas turbine engine. The combustion gases are then routed out of the hot gas path via the exhaust section.

As the combustion gases flow through the hot gas path, thermal energy is transferred from the combustion gases to various turbine hardware components such as stator vanes, turbine rotor blades, turbine shroud seals and other turbine hardware components. As a result, it is necessary and/or beneficial to cool the various turbine hardware components to meet thermal and/or mechanical performance requirements.

Typically, a cooling medium such as compressed air from the compressor section is routed through various cooling passages or circuits defined within or around the various turbine hardware components. However, undesirably high thermal stresses in the various turbine hardware components may occur due to thermal gradients associated with high combustion gas temperatures and significantly lower cooling medium temperatures. Accordingly, a system for cooling a turbine engine that reduces thermal stresses in the various turbine hardware components, particularly the turbine shroud assemblies, would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for cooling a turbine engine. The system includes a first cooling medium source, a first stator vane having an internal flow passage that is in fluid communication with the cooling medium source and a first turbine shroud assembly having an internal flow passage that is in fluid communication with the internal flow passage of the first stator vane. The system further includes a second cooling medium source, a second stator vane that is disposed downstream from the first stator vane and that includes an internal flow passage. The first stator vane and the second stator vane at least partially define a hot gas path through the turbine. The system further includes a bypass flow passage that is at least partially defined between a baffle and an outer band portion of the stator vane. The bypass flow passage and the internal flow passage of the second stator vane are in fluid communication with the second cooling medium source. The system further includes a second turbine shroud assembly having an internal flow passage that is in fluid communication with at least one of the internal flow passage of the second stator vane and the bypass flow passage.

In another aspect, the present subject matter is directed to a system for cooling a turbine engine. The system includes a first cooling medium source, a first stator vane having an internal flow passage that is in fluid communication with the cooling medium source and a first turbine shroud assembly having an internal flow passage that is in fluid communication with the internal flow passage of the first stator vane. The system further includes a second cooling medium source. A second stator vane is disposed downstream from the first stator vane. The second stator vane includes an internal flow passage. The first stator vane and the second stator vane at least partially define a hot gas path through the gas turbine engine. A bypass flow passage is at least partially defined between a baffle and an outer band of the stator vane. The bypass flow passage and the internal flow passage of the second stator vane are in fluid communication with the second cooling medium source. The system further includes a second turbine shroud assembly having an internal flow passage that is in fluid communication with at least one of the internal flow passage of the second stator vane and the bypass flow passage.

Another aspect of the present subject matter is directed to a system for cooling a turbine engine. The system includes a first stage of the turbine engine having a stator vane and a turbine shroud assembly. The stator vane has an internal flow passage that is in fluid communication with a cooling medium source. The turbine shroud assembly includes an internal flow passage that is in fluid communication with the internal flow passage of the stator vane. The system further includes a second stage of the turbine engine that is disposed downstream from the first stage. The second stage includes a stator vane and a turbine shroud assembly. The stator vane of the second stage includes an internal flow passage that is in fluid communication with the internal flow passage of the turbine shroud assembly of the first stage. The turbine shroud assembly of the second stage includes an internal flow passage that is in fluid communication with the internal flow passage of the stator vane of the second stage.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
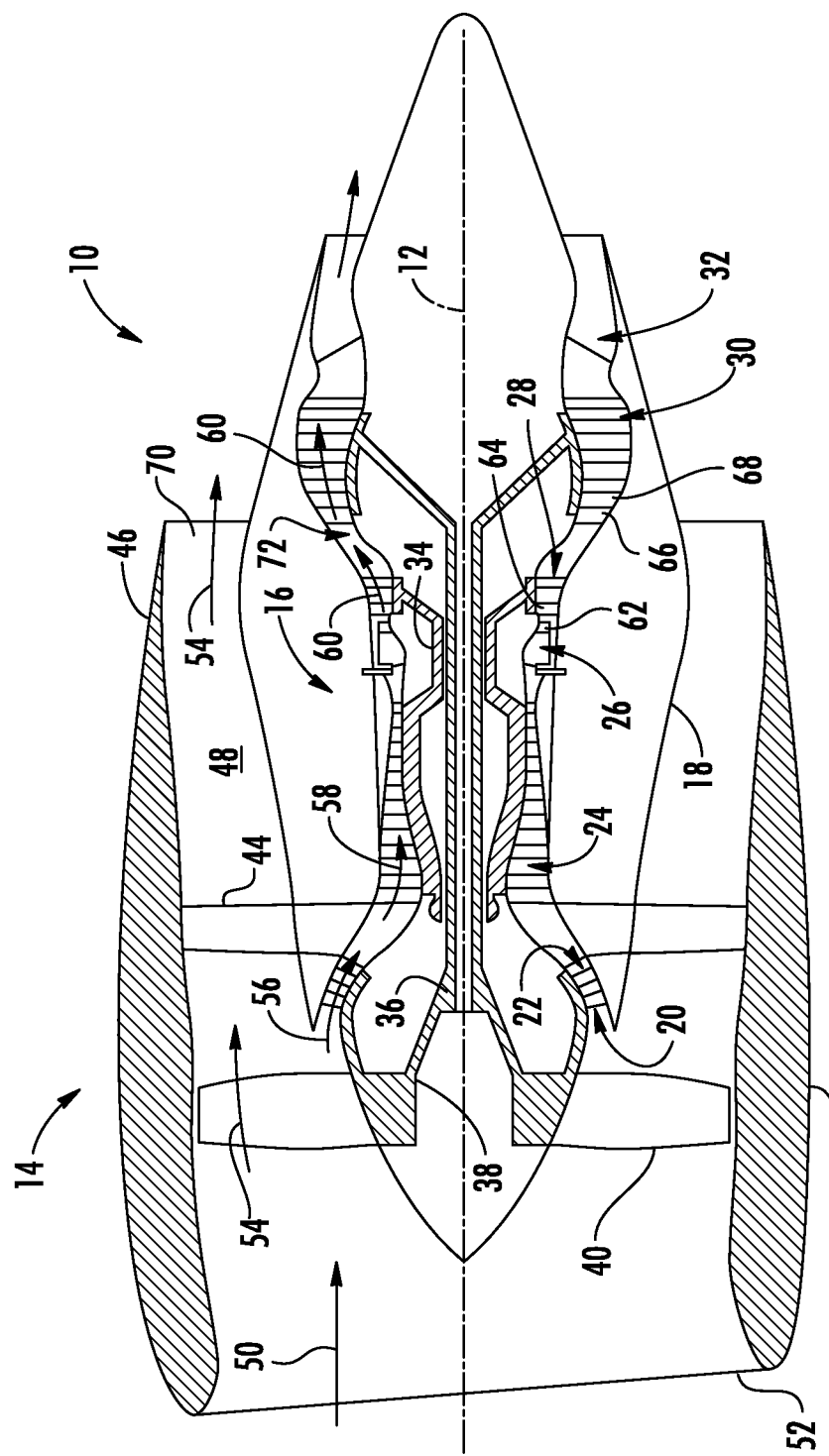
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of an exemplary high-bypass turbofan jet engine 10 herein referred to as "turbofan 10" as may incorporate various embodiments of the present invention. As shown in FIG. 1, the turbofan 10 has a longitudinal or axial centerline axis 12 that extends therethrough for reference purposes. In general, the turbofan 10 may include a fan section 14 and a core turbine engine or gas turbine engine 16 disposed downstream from the fan section 14.

The core turbine engine 16 may generally include a substantially tubular outer casing 18 that defines an annular inlet 20. The outer casing 18 encases, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30, and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The (LP) shaft or spool 36 may also be connected to a fan spool or shaft 38 of the fan section 14. In particular embodiments, as shown in FIG. 1, the (LP) shaft or spool 36 may be connected directly to the fan spool 38 such as in a direct-drive configuration. In alternative embodiments, the (LP) shaft or spool 36 may be connected to the fan spool 38 via a reduction gear (not shown) such as in an indirect-drive or geared-drive configuration.

As shown in FIG. 1, the fan section 14 includes a plurality of fan blades 40 that are coupled to and that extend radially outwardly from the fan spool 38. An annular fan casing or nacelle 42 circumferentially surrounds the fan section 14 and/or at least a portion of the core turbine engine 16. It should be appreciated by those of ordinary skill in the art that the nacelle 42 may be configured to be supported relative to the core turbine engine 16 by a plurality of circumferentially-spaced outlet guide vanes 44. Moreover, a downstream section 46 of the nacelle 42 may extend over an outer portion of the core turbine engine 16 so as to define a bypass airflow passage 48 therebetween.

During operation of the turbofan 10, a volume of air 50 enters the turbofan 10 through an associated inlet 52 of the nacelle 42 and/or fan section 14. As the volume of air 50 passes across the fan blades 40 a first portion of the air 50 as indicated by arrows 54 is directed or routed into the bypass airflow passage 48 and a second portion of the air 50 as indicated by arrow 56 is directed or routed into the LP compressor 22. The ratio between the first portion of air 54 and the second portion of air 56 is commonly known as bypass ratio. The pressure of the second portion of air 56 is then increased as it is routed towards the high pressure (HP) compressor 24 (as indicated by arrow 58). The second portion of air 58 is routed from the HP compressor 24 into the combustion section 26 where it is mixed with fuel and burned to provide combustion gases 60.

The combustion gases 60 are routed through the HP turbine 28 where a portion of thermal and/or kinetic energy from the combustion gases 60 is extracted via sequential stages of HP turbine stator vanes 62 that are coupled to the outer casing 18 and HP turbine rotor blades 64 that are coupled to the HP shaft or spool 34, thus causing the HP shaft or spool 34 to rotate, thereby supporting operation of the HP compressor 24. The combustion gases 60 are then routed through the LP turbine 30 where a second portion of thermal and kinetic energy is extracted from the combustion gases 60 via sequential stages of LP turbine stator vanes 66 that are coupled to the outer casing 18 and LP turbine rotor blades 68 that are coupled to the LP shaft or spool 36, thus causing the LP shaft or spool 36 to rotate, thereby supporting operation of the LP compressor 22 and/or rotation of the fan spool or shaft 38.

The combustion gases 60 are then routed through the jet exhaust nozzle section 32 of the core turbine engine 16 to provide propulsive thrust. Simultaneously, the pressure of the first portion of air 54 is substantially increased as the first portion of air 54 is routed through the bypass airflow passage 48 before it is exhausted from a fan nozzle exhaust section 70 of the turbofan 10 providing propulsive thrust. The HP turbine 28, the LP turbine 30 and the jet exhaust nozzle section 32 at least partially define a hot gas path 72 for routing the combustion gases 60 through the core turbine engine 16.

During operation of the core turbine engine 16, the temperature of the combustion gases 60 flowing through the HP and LP turbine sections, particularly through the HP turbine 28, may be extreme. For example, the combustion gases flowing through a portion of the hot gas path 72 defined by/within the HP turbine 28 may exceed 2000 degrees Fahrenheit. As a result, it is necessary and/or beneficial to cool the various turbine hardware components of the HP turbine 28 and/or the LP turbine 30 such as but not limited to the stator vanes 62, 66, turbine shroud seals (as illustrated and in FIGS. 2-6 and as described in detail below)

and/or the turbine rotor blades 64, 68 to meet thermal and/or mechanical performance requirements.

Along with a turbofan engine 14, a core turbine 16 serves a similar purpose and sees a similar environment in land based gas turbine, a turbojet engine, where the ratio of the first portion of air 54 to the second portion of air 56 is less than that of a turbo fan, and in an unducted fan engine, where the fan section 14 is devoid of a nacelle 46. In each of the turbofan, turbojet, and unducted engines, a speed reduction device, for example, a reduction gearbox, may be included between any shafts and spools, for example, between the (LP) shaft or spool 36 and the fan spool or shaft 38 of the fan section 14.

According to various embodiments of the present invention, a system for cooling a turbine engine includes in serial flow order, a cooling medium source, at least one stator vane having an internal flow passage that is in fluid communication with the cooling medium source and a turbine shroud assembly having an internal flow passage that is in fluid communication with the internal flow passage of the stator vane.

Figure 2:
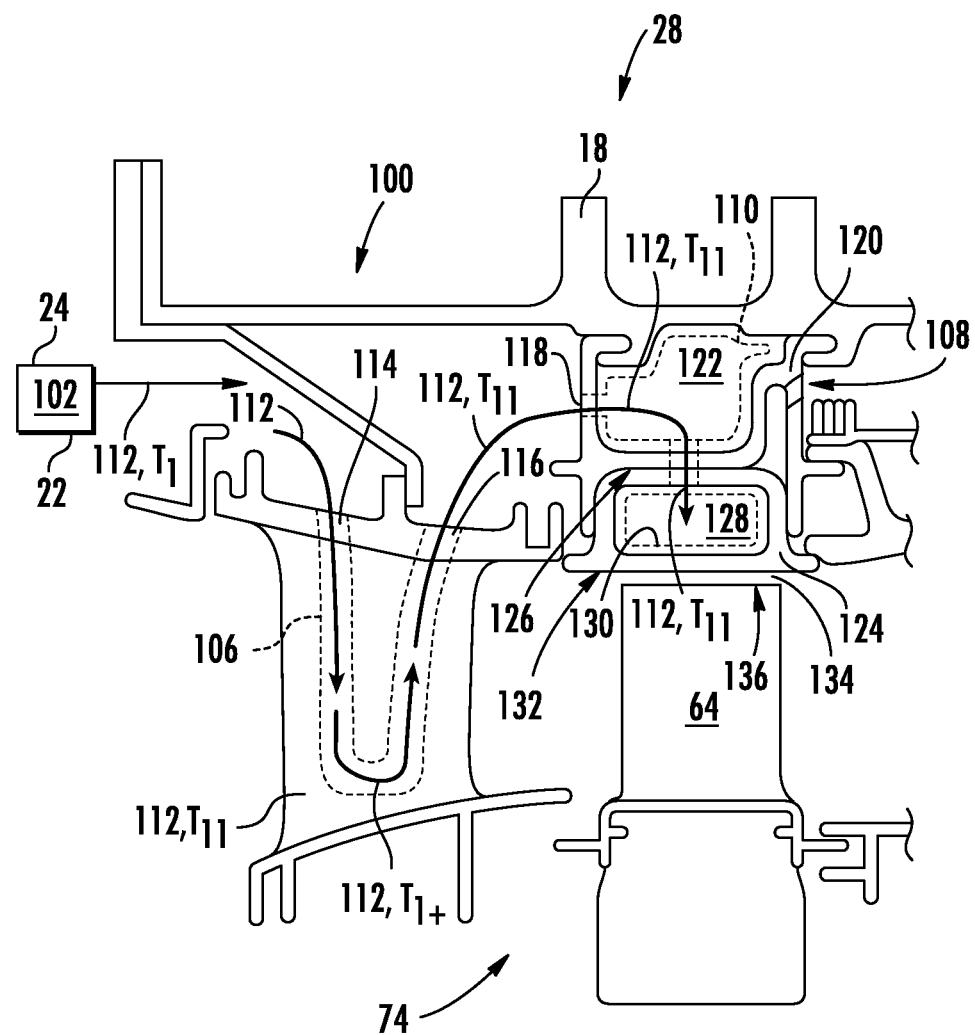
FIG. 2 is an enlarged cross sectional side view of a first stage portion of the gas turbine engine as shown in FIG. 1, including an exemplary embodiment of a system for cooling a turbine of a gas turbine engine, according to one embodiment of the present invention.

FIG. 2 provides a cross sectional side view of a first stage portion 74 of the HP turbine of the core turbine engine 16 including an exemplary embodiment of a system for cooling a turbine engine 100, herein referred to as "system 100", according to one embodiment of the present invention. It should be appreciated that the system 100 as provided and described herein with regards to the HP turbine 28, may be used to cool the various turbine hardware components of the LP turbine as well and the system 100 is not limited to the HP turbine 28 unless otherwise recited in the claims.

As shown in FIG. 2, system 100 includes in serial flow order, a cooling medium source 102, a stator vane 104 having an internal flow passage 106 defined or formed therein, and a turbine shroud assembly 108 having an internal flow passage 110 defined or formed therein. In particular embodiments, the cooling medium supply 102 may include at least one of the HP compressor 24 and/or the LP compressor 22. In operation, the cooling medium supply 102 provides a compressed cooling medium (as indicated by arrow 112) at a first temperature $T_1$ to an inlet 114 of the internal flow passage 106 of the stator vane 104. The cooling medium 112 may comprise compressed air from at least one of the HP compressor 24 and/or the LP compressor 22.

As the cooling medium 112 progresses through the internal passage 106, thermal energy from the stator vane 104 is absorbed by the cooling medium 112, thus increasing the temperature of the cooling medium from $T_1$ to a higher temperature $T_{11}$. The cooling medium 112 exits the internal flow passage 106 via an outlet 116. The cooling medium 112 is then directed or routed towards an inlet 118 of the internal flow passage 110 of the turbine shroud assembly 108.

The inlet 118 may be at least partially defined within a shroud block or ring portion 120 of the turbine shroud assembly 108. The internal flow passage 110 of the turbine shroud assembly 108 may be at least partially defined within the shroud block or ring portion 120. For example, the shroud block or ring portion 120 may at least partially define a flow distribution plenum 122 that is in fluid communication with the inlet 118. In particular embodiments, the internal flow passage 110 may be at least partially defined by a shroud seal 124 that is coupled to a radially inner portion 126 of the shroud block or ring portion 120. In one embodiment, the shroud seal 124 at least partially defines a cooling air plenum 128 that is in fluid communication with the flow distribution plenum 122.

The shroud seal 124 generally includes an inner or cool side surface 130 and a seal surface 132 that is at least partially exposed to the combustion gases 60 flowing through the hot gas path 72. A radial gap 134 is defined between the seal surface 132 of the shroud seal 124 and tip portion 136 of one of the turbine rotor blades 64. The shroud seal 124 prevents and/or controls leakage of the combustion gases 60 through the radial gap 134 during operation of the core turbine engine 16.

The shroud seal 124 and/or the seal surface 132 may be formed from a material or materials having a high thermal capacity such as a metal alloy, a ceramic or a ceramic matrix composite so as to accommodate the high temperature combustion gases 60 that flow through the hot gas path 72. In particular embodiments, the shroud seal 124 and/or the seal surface 132 may be formed from material that is different (i.e. has different thermal/mechanical properties) from material(s) which form or make up the various other hardware components such as the stationary vane 104, the outer casing 18 and/or the turbine rotor blades 64.

Once the cooling medium 112 enters the internal flow passage 110 of the turbine shroud assembly 108, it may be directed across and/or impinged upon the inner surface 130 of the shroud seal 124, thus providing at least one of convection, or impingement cooling to the shroud seal 124. The elevated temperature of the cooling medium 112 at $T_{11}$ when compared to its initial temperature $T_1$ may reduce through thickness and/or peak thermal gradients between the shroud seal 124 and the cooling medium 112, thus reducing thermal stresses on the shroud seal 124. This may be particularly beneficial when the shroud seal 124 and/or the seal surface 132 is formed from a ceramic or ceramic matrix composite material.

Figure 3:
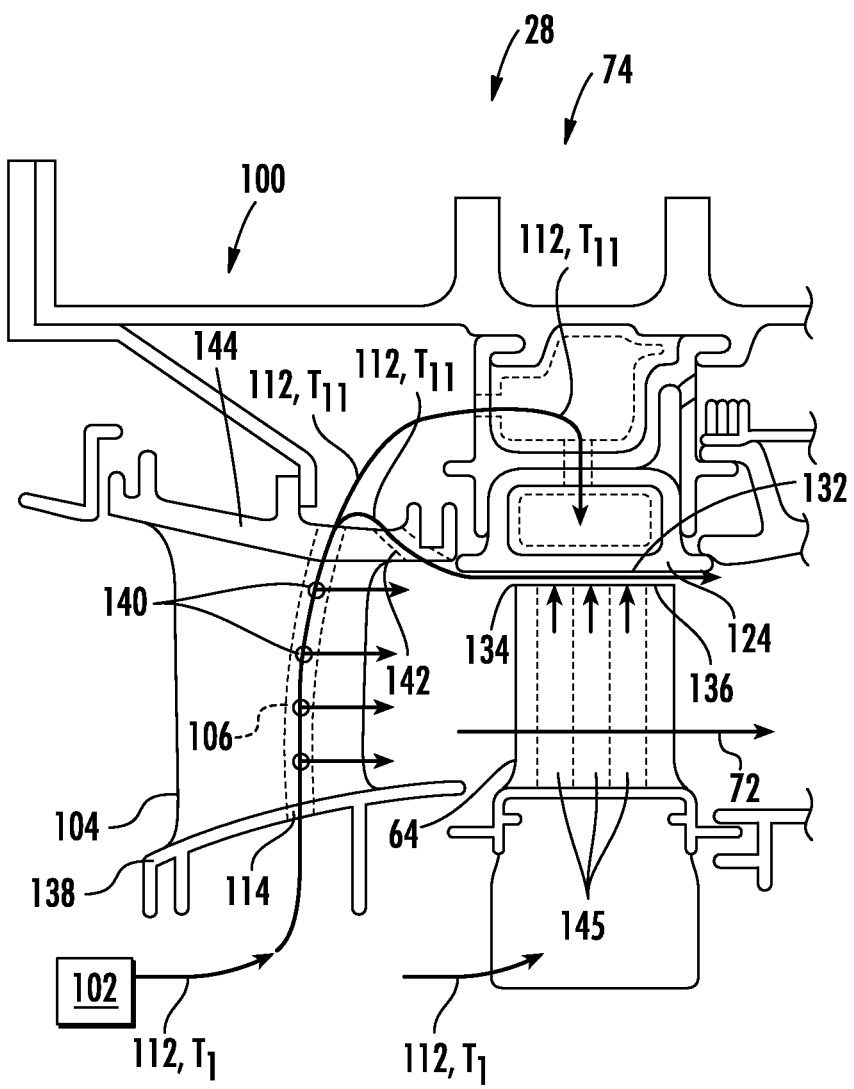
FIG. 3 is an enlarged cross sectional side view of a first stage portion of the gas turbine engine as shown in FIG. 1, including an exemplary embodiment of a system for cooling a turbine engine, according to one embodiment of the present invention.

FIG. 3 provides a cross sectional side view of a portion of the HP turbine 28 of the core turbine engine 16 as shown in FIG. 2, including an exemplary embodiment of the system 100, according to one embodiment of the present invention. In one embodiment as shown in FIG. 3, the inlet 114 to the internal passage 106 of the stator vane 104 may be formed or disposed along a bottom or inner band portion 138 of the stator vane 104. In one embodiment, the stator vane 104 may at least partially define a plurality of holes or apertures 140 that provide for fluid communication out of the internal flow passage 106 along a span of the stator vane 104.

In particular embodiments, a bypass flow passage 142 may be at least partially defined by a top or outer band portion 144 of the stator vane 104 the bypass flow passage 142 provides for fluid communication through the outer band portion 144 of the stator vane and into the hot gas path 72. The bypass flow passage 142 may be configured or oriented to direct the cooling medium 112 towards the radial gap 134, thus providing cooling to the seal surface 132 of the shroud seal 124. In one embodiment, the system 100 may further include various cooling passages 145 defined within the turbine rotor blades 64. The cooling passages 145 may be configured or oriented to provide a separate flow of the cooling medium 112 from the turbine rotor blades 64 into the radial gap 134 towards the seal surface 132 of the shroud seal 124.

Figure 4:
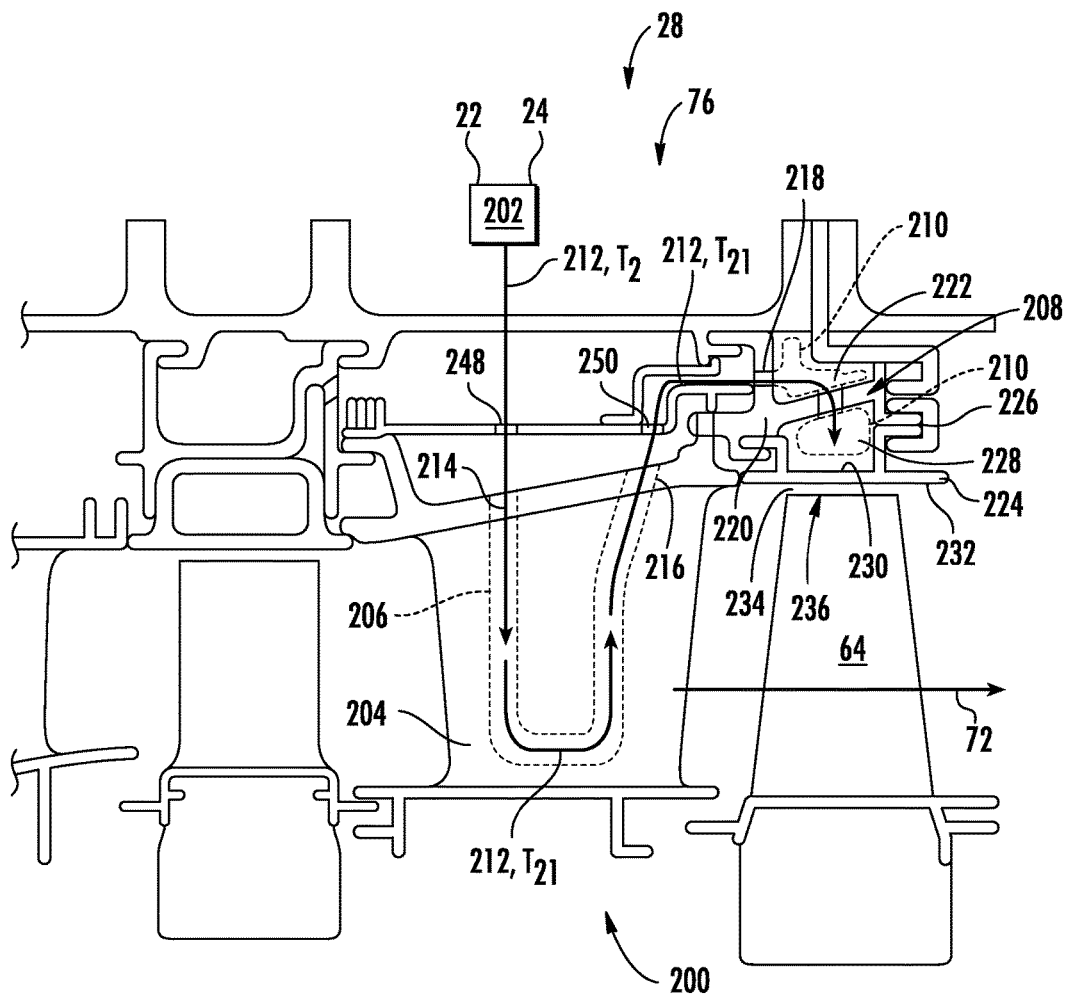
FIG. 4 is an enlarged cross sectional side view of a second stage portion of the gas turbine engine as shown in FIG. 1, including an exemplary embodiment of a system for cooling a turbine engine, according to one embodiment of the present invention.

FIG. 4 is a cross sectional side view of a second stage portion 76 of the HP turbine 28 of the core turbine engine 16 as shown in FIG. 1, including an exemplary embodiment of a system for cooling a turbine of a gas turbine engine 200, according to one embodiment of the present invention. As shown in FIG. 4, system 200 includes in serial flow order, a cooling medium source 202, a stator vane 204 having an internal flow passage 206 defined or formed therein, and a turbine shroud assembly 208 having an internal flow passage 210 defined or formed therein. In particular embodiments, the cooling medium supply 202 may include at least one of the HP compressor 24 and/or the LP compressor 22. In operation, the cooling medium supply 202 provides a compressed cooling medium (as indicated by arrow 212) at a first temperature $T_2$ to an inlet 214 of the internal flow passage 206 of the stator vane 204. The cooling medium 212 may comprise compressed air from at least one of the HP compressor 24 and/or the LP compressor 22.

As the cooling medium 212 progresses through the internal passage 206, thermal energy from the stator vane 204 is absorbed by the cooling medium 212, thus increasing the temperature of the cooling medium 212 from $T_2$ to a higher temperature $T_{21}$. The cooling medium 212 exits the internal flow passage 206 via an outlet 216. The cooling medium 212 is then directed or routed towards an inlet 218 of the internal flow passage 210 of the turbine shroud assembly 208.

The inlet 218 may be at least partially defined within a shroud block or ring portion 220 of the turbine shroud assembly 208. The internal flow passage 210 of the turbine shroud assembly 208 may be at least partially defined within the shroud block or ring portion 220. For example, the shroud block or ring portion 220 may at least partially define a flow distribution plenum 222 that is in fluid communication with the inlet 218. In particular embodiments, the internal flow passage 210 may be at least partially defined by a shroud seal 224 that is coupled to a radially inner portion 226 of the shroud block or ring portion 220. In one embodiment, the shroud seal 224 at least partially defines a cooling air plenum 228 that is in fluid communication with the flow distribution plenum 222.

The shroud seal 224 generally includes an inner or cool side surface 230 and a seal surface 232 that is at least partially exposed to the combustion gases 60 flowing through the hot gas path 72. A radial gap 234 is defined between the seal surface 232 of the shroud seal 224 and tip portion 236 of one of the turbine rotor blades 64 of the second stage portion 76. The shroud seal 224 prevents and/or controls leakage of the combustion gases 60 through the radial gap 234 during operation of the core turbine engine 16.

The shroud seal 224 and/or the seal surface 232 may be formed from a material or materials having a high thermal capacity such as a metal alloy, a ceramic or a ceramic matrix composite so as to accommodate the high temperature combustion gases 60 that flow through the hot gas path 72. In particular embodiments, the shroud seal 224 and/or the seal surface 232 is formed from material that is different (i.e. has different thermal/mechanical properties) from material(s) which form or make up the various other hardware components such as the stationary vane 204, the outer casing 18 and/or the turbine rotor blades 64 of the second stage portion 76.

Once the cooling medium 212 enters the internal flow passage 210 of the turbine shroud assembly 208, it may be directed across and/or impinged upon the inner surface 230 of the shroud seal 224, thus providing at least one of convection, or impingement cooling to the shroud seal 224. The elevated temperature of the cooling medium 212 at $T_{21}$ when compared to its initial temperature $T_2$ may reduce through thickness and/or peak thermal gradients between the shroud seal 224 and the cooling medium 212, thus reducing thermal stresses on the shroud seal 224. This may be particularly beneficial when the shroud seal 224 and/or the seal surface 232 is formed from a ceramic or ceramic matrix composite material.

Figure 5:
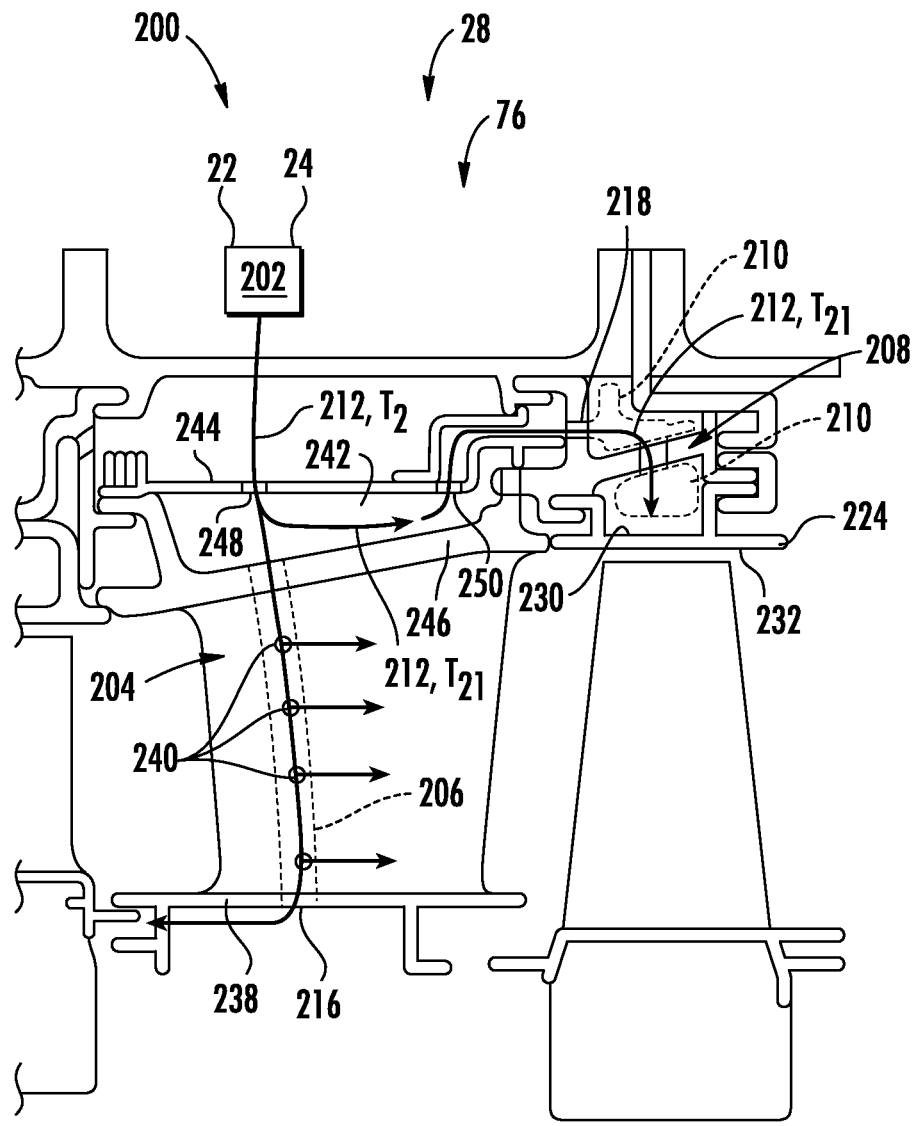
FIG. 5 is an enlarged cross sectional side view of a second stage portion of the gas turbine engine as shown in FIG. 1, including an exemplary embodiment of a system for cooling a turbine engine, according to one embodiment of the present invention.

FIG. 5 provides a cross sectional side view of a portion of the second stage portion 76 of the HP turbine 28 as shown in FIG. 4, including an exemplary embodiment of the system 200, according to one embodiment of the present invention. In one embodiment as shown in FIG. 5, the outlet 216 to the internal passage 206 of the stator vane 204 may be formed or disposed along a bottom or inner band portion 238 of the stator vane 204. In one embodiment, the stator vane 204 may at least partially define a plurality of holes or apertures 240 that provide for fluid communication out of the internal flow passage 206 along a span of the stator vane 206.

In particular embodiments, a bypass flow passage 242 may be at least partially defined between a baffle 244 and a top or outer band portion 246 of the stator vane 204. In operation, the cooling medium 212 enters the bypass flow passage 242 via inlet 248 at a first temperature $T_2$. As the cooling medium 212 flows across the top or outer band portion 246 of the stator vane 204 and through the bypass flow passage 242, thermal energy is absorbed by the cooling medium 212, thus increasing the temperature from $T_2$ to temperature $T_{21}$. The cooling medium 212 exits the bypass passage 242 via an outlet 250. The cooling medium 212 is then directed or routed towards the inlet 218 of the internal flow passage 210 of the turbine shroud assembly 208.

Once the cooling medium 212 enters the internal flow passage 210 of the turbine shroud assembly 208, it may be directed across and/or impinged upon the inner surface 230 of the shroud seal 224, thus providing at least one of convection, or impingement cooling to the shroud seal 224. The elevated temperature of the cooling medium 212 at $T_{21}$ when compared to its initial temperature $T_2$ may reduce through thickness and/or peak thermal gradients between the shroud seal 224 and the cooling medium 212, thus reducing thermal stresses on the shroud seal 224. This may be particularly beneficial when the shroud seal 224 and/or the seal surface 232 is formed from a ceramic or ceramic matrix composite material.

Figure 6:
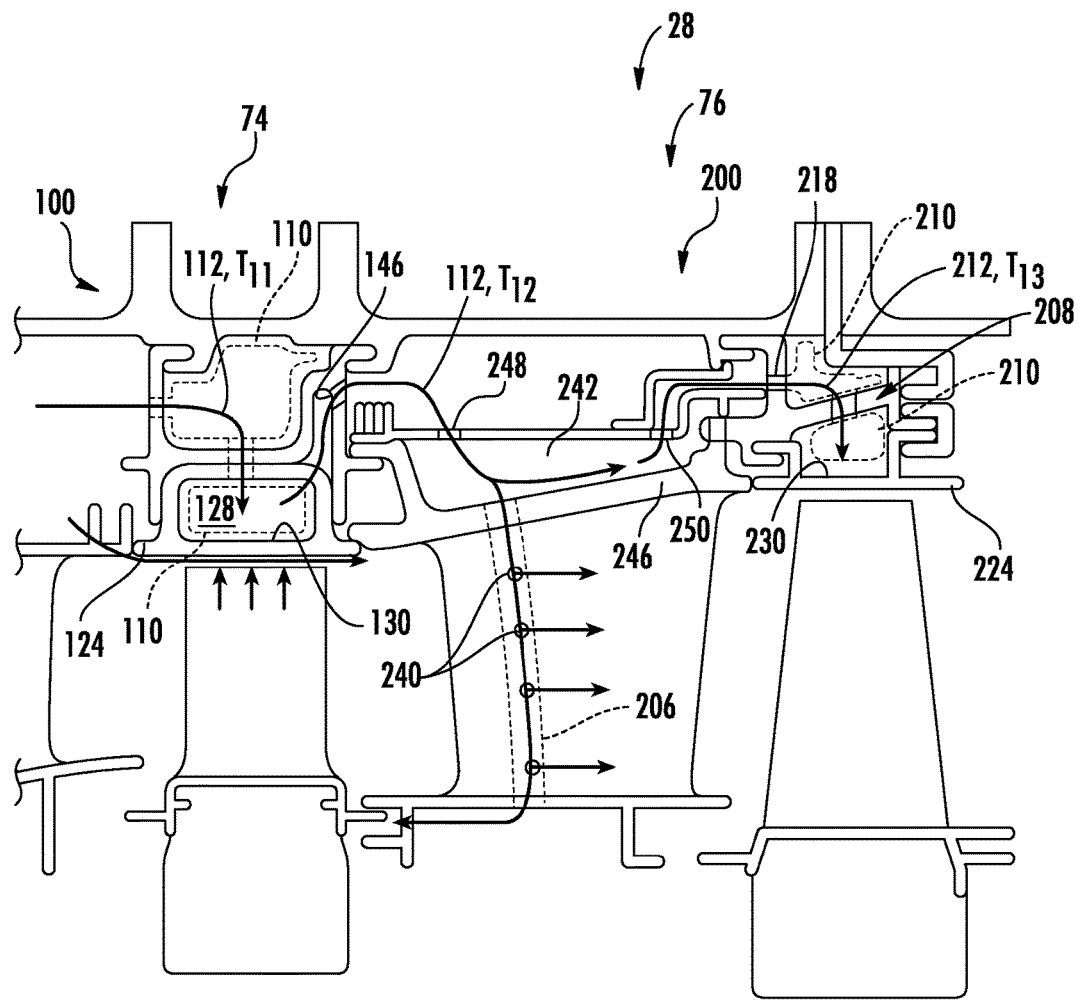
FIG. 6 is an enlarged cross sectional side view of a portion of a first stage portion and a second stage portion of the gas turbine engine as shown in FIG. 1, including an exemplary embodiment of a system for cooling a turbine engine, according to one embodiment of the present invention.

FIG. 6 provides a cross sectional side view of the HP turbine 28 of the core turbine engine 16 including a portion of the first stage portion 74 and the second stage portion 76 as shown in FIG. 5 according to one embodiment of the present invention. In one embodiment, as shown in FIG. 6, the bypass flow passage 242 of the system 200 may be in fluid communication with the internal flow passage 110 of the turbine shroud assembly 108 of the first stage portion 74 of the HP turbine 28. In operation, as previously provided with regards to system 100, the cooling medium 112 flows into the internal flow passage 110 of the turbine shroud assembly 108 at $T_{11}$. As the cooling medium 112 flows across and/or is impinged upon the inner surface 130 of the shroud seal 124, thermal energy from the shroud seal 124 is absorbed, thus further increasing the temperature of the cooling medium from $T_{11}$ to temperature $T_{12}$.

The cooling medium 112 then flows out of the turbine shroud assembly 108 through an outlet 146 and towards inlet 248 which provides for fluid communication into the bypass flow passage 242. At least a portion of the cooling medium 112 flows across the top or outer band portion 246 of the stator vane 204 of the second stage portion 76. As a result, additional thermal energy is absorbed by the cooling medium 212, thus increasing the temperature from $T_{12}$ to temperature $T_{13}$. In one embodiment, a second portion of the cooling medium 112 may flow through the internal flow passage 206 of the stator vane 204 of the second stage portion 76. The cooling medium 112 exits the bypass passage 242 via outlet 250. The cooling medium 112 is then directed or routed towards the inlet 218 of the internal flow passage 210 of the turbine shroud assembly 208.

Once the cooling medium 112 enters the internal flow passage 210 of the turbine shroud assembly 208, it may be directed across and/or impinged upon the inner surface 230 of the shroud seal 224, thus providing at least one of convection, or impingement cooling to the shroud seal 224. The elevated temperature of the cooling medium 112 at $T_{13}$ when compared to its initial temperature $T_1$ may reduce through thickness and/or peak thermal gradients between the shroud seal 224 and the cooling medium 112, thus reducing thermal stresses on the shroud seal 224. This may be particularly beneficial when the shroud seal 224 and/or the seal surface 232 is formed from a ceramic or ceramic matrix composite material.

The various embodiments of the system for cooling a turbine engine as illustrated in FIGS. 2-6 and as described and claimed herein, provide various technical benefits over conventional cooling schemes for turbine engines. For example, by reusing or routing the cooling medium 112, 212 through and/or across multiple high temperature surfaces within the turbine, the overall cooling effectiveness of the cooling medium 112, 212 may be enhanced when compared with using the cooling medium in a single cooling pass configuration. In addition, by using the warmer cooling medium, with respect to the $T_1$ and $T_2$ temperatures to cool downstream components such as the shroud assemblies 108, 208, thermal stresses in the downstream components may be decreased due to reduced thermal gradients and/or reduced peak thermal gradients between the cooling medium 112, 212 and the components to be cooled.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for cooling a turbine, the system comprising:
   a cooling medium source;
   a first stator vane having an internal flow passage that is in fluid communication with the cooling medium source and having a first bypass flow passage at least partially defined between a baffle and an outer band portion of the first stator vane; and
   a first turbine shroud assembly, the first turbine shroud assembly comprising:
   a first internal flow passage comprising a flow distribution plenum, the flow distribution plenum in fluid communication with the internal flow passage of the first stator vane; and
   a second internal flow passage comprising a cooling air plenum, the cooling air plenum in fluid communication with the flow distribution plenum;
   wherein the cooling air plenum is radially inward of the flow distribution plenum; and
   wherein the cooling medium traveling through the first bypass flow passage is divided such that a first portion of the cooling medium travels into the first internal flow passage of the first turbine shroud assembly and a second portion of the cooling medium travels into a hot gas path of the turbine.

2. The system as in claim 1, wherein the cooling medium source comprises at least one of a low pressure compressor and a high pressure compressor.

3. The system as in claim 1, wherein the internal flow passage of the first stator vane includes at least one hole, wherein the at least one hole provides for fluid communication out of the internal flow passage of the first stator vane along a span of the first stator vane.

4. The system as in claim 1, wherein the internal flow passage of the first stator vane includes an inlet in fluid communication with the cooling medium source and an outlet that is in fluid communication with the first turbine shroud assembly and the first bypass flow passage.

5. The system as in claim 4, wherein the inlet and the outlet of the first stator vane are formed along an outer band portion of the first stator vane.

6. The system as in claim 4, wherein the inlet is formed along an inner band portion of the first stator vane.

7. The system as in claim 1, wherein the first stator vane includes a second bypass flow passage defined by an outer band portion of the first stator vane downstream from the internal flow passage of the first stator vane, wherein the second bypass flow passage provides for fluid communication between the internal flow passage of the first stator vane and the hot gas path of the turbine.

8. The system as in claim 1, wherein the first stator vane and the first turbine shroud assembly are turbine components of a first stage portion of a high pressure turbine.

9. The system as in claim 1, further comprising a turbine rotor blade radially spaced from a seal surface of a shroud seal of the first turbine shroud assembly, the turbine rotor blade including a plurality of cooling passages, wherein the cooling passages are oriented towards the seal surface of the shroud seal.

10. A system for cooling a turbine, the system comprising:
    a first cooling medium source from at least one of a HP compressor or a LP compressor of the turbine;
    a first stator vane having an internal flow passage and having a first bypass flow passage at least partially defined between a baffle and an outer band portion of the first stator vane, the internal flow passage of the stator vane in fluid communication with the first cooling medium source;
    a first turbine shroud assembly having a first internal flow passage, the first internal flow passage of the turbine shroud in fluid communication with the internal flow passage of the first stator vane;
    a second cooling medium source from at least one of the HP compressor or the LP compressor of the turbine;
    a second stator vane disposed downstream from the first stator vane, the second stator vane having an internal flow passage, wherein the first stator vane and the second stator vane at least partially define a hot gas path through the turbine;
    a second bypass flow passage at least partially defined between a baffle and an outer band portion of the second stator vane, wherein the second bypass flow passage and the internal flow passage of the second stator vane are in fluid communication with the second cooling medium source; and
    a second turbine shroud assembly having an internal flow passage that is in fluid communication with at least one of the internal flow passage of the second stator vane and the second bypass flow passage;

wherein a cooling medium traveling from the first cooling medium source through the first bypass flow passage is divided such that a first portion of the cooling medium from the first cooling medium source travels through the first bypass flow passage and into the first internal flow passage of the first turbine shroud assembly and a second portion of the cooling medium from the first cooling medium source travels through the internal flow passage of the first stator vane; and wherein a cooling medium traveling from the second cooling medium source through the second bypass flow passage is divided such that a first portion of the cooling medium from the second cooling medium source travels through the second bypass flow passage and into the first internal flow passage of the second turbine shroud assembly and a second portion of the cooling medium from the second cooling medium source travels through the internal flow passage of the second stator vane.

11. The system as in claim 10, wherein the internal flow passage of the first stator vane includes at least one hole, wherein the at least one hole provides for fluid communication out of the internal flow passage of the first stator vane along a span of the first stator vane,
wherein the first internal flow passage of the first turbine shroud assembly comprises a flow distribution plenum, the flow distribution plenum in fluid communication with the internal flow passage of the first stator vane,
wherein the first turbine shroud assembly comprises a second internal flow passage comprising a cooling air plenum, the cooling air plenum in fluid communication with the flow distribution plenum of the first turbine shroud assembly, and
wherein the cooling air plenum is radially inward of the flow distribution plenum of the first turbine shroud assembly.

12. The system as in claim 10, wherein the internal flow passage of the second stator vane includes at least one hole, wherein the at least one hole provides for fluid communication out of the internal flow passage of the second stator vane along a span of the second stator vane.

13. The system as in claim 10, wherein the internal flow passage of the first or second stator vane includes an inlet in fluid communication with the first cooling medium source and an outlet that is in fluid communication with the turbine shroud assembly.

14. The system as in claim 11, wherein the cooling air plenum of the first turbine shroud assembly is defined within a shroud seal portion of the first turbine shroud assembly, wherein the shroud seal portion of the first turbine shroud assembly is formed from a ceramic matrix composite (CMC) material.

15. The system as in claim 14, wherein the second cooling medium source provides a second cooling medium to the system, the second cooling medium further comprising:
a first portion of the second cooling medium that flows across the outer band portion of the second stator vane; and
a second portion of the second cooling medium that flows through the internal flow passage of the second stator vane.

16. The system as in claim 10, wherein the first stator vane includes a bypass flow passage defined by an outer band portion of the first stator vane, wherein the bypass flow passage is downstream from the internal flow passage of the first stator vane, wherein the bypass flow passage provides for fluid communication between the internal flow passage of the first stator vane and the hot gas path of the turbine.

17. The system as in claim 10, wherein the first stator vane and the first turbine shroud assembly are turbine hardware components of a first stage portion of a high pressure turbine and the second stator vane and the second turbine shroud assembly are turbine hardware components of a second stage portion of the high pressure turbine.

* * * * *